(12) United States Patent
Walter

(10) Patent No.: US 6,935,596 B2
(45) Date of Patent: Aug. 30, 2005

(54) PROCESS AND SYSTEM FOR PILOTING AN AIRCRAFT

(75) Inventor: Stéphane Walter, L'Isle Jourdain (FR)

(73) Assignee: Airbus France, Toulouse (FR)

( * ) Notice: Subject to any disclaimer, the term of this patent is extended or adjusted under 35 U.S.C. 154(b) by 0 days.

(21) Appl. No.: 10/458,751

(22) Filed: Jun. 11, 2003

(65) Prior Publication Data

US 2005/0151024 A1    Jul. 14, 2005

(30) Foreign Application Priority Data

Jun. 12, 2002 (FR) ................................. 02 07197

(51) Int. Cl.[7] ............................................. G05D 3/00
(52) U.S. Cl. ....................... 244/195; 244/76 R; 701/11
(58) Field of Search ............................. 244/76 R, 194, 244/195; 701/11, 3, 4

(56) References Cited

U.S. PATENT DOCUMENTS

| | | |
|---|---|---|
| 3,793,574 A | 2/1974 | Hamel |
| 3,848,833 A | 11/1974 | Rauschelbach |
| 4,011,440 A | 3/1977 | Steglich |
| 4,032,094 A * | 6/1977 | Morgan et al. ............. 244/194 |
| 4,209,734 A * | 6/1980 | Osder .......................... 318/564 |
| 5,127,608 A * | 7/1992 | Farineau et al. .......... 244/76 R |
| 5,197,697 A * | 3/1993 | Lyloc et al. ................. 244/197 |
| 5,233,542 A * | 8/1993 | Hohner et al. .............. 702/199 |
| 5,615,119 A * | 3/1997 | Vos .............................. 701/4 |
| 5,722,620 A * | 3/1998 | Najmabadi et al. ......... 244/181 |
| 5,979,835 A * | 11/1999 | Najmabadi et al. ......... 244/182 |
| 6,044,311 A * | 3/2000 | Larramendy et al. ......... 701/10 |
| 2003/0135307 A1 * | 7/2003 | Hellio et al. .................. 701/4 |

OTHER PUBLICATIONS

Preliminary Search Report dated Mar. 24, 2003.

* cited by examiner

Primary Examiner—Peter M. Poon
Assistant Examiner—T D Collins
(74) Attorney, Agent, or Firm—Stevens, Davis, Miller & Mosher, LLP

(57) ABSTRACT

The piloting system (1) for generating orders for piloting the aircraft according to at least one piloting axis, for example the pitch axis, the roll axis, the yaw axis or the engine thrust control axis, comprises at least two piloting means (2, 3), each of which is capable of calculating the derivative with respect to time of the function which represents the corresponding piloting law and which takes into account the current values of parameters of the aircraft, first means (4) for intercomparing the derivatives calculated by the piloting means (2, 3) and for selecting a derivative; and second means (10) for integrating a selected derivative in such a way as to obtain said piloting order according to said piloting axis.

13 Claims, 3 Drawing Sheets

PROCESS AND SYSTEM FOR PILOTING AN AIRCRAFT

Figure 1:
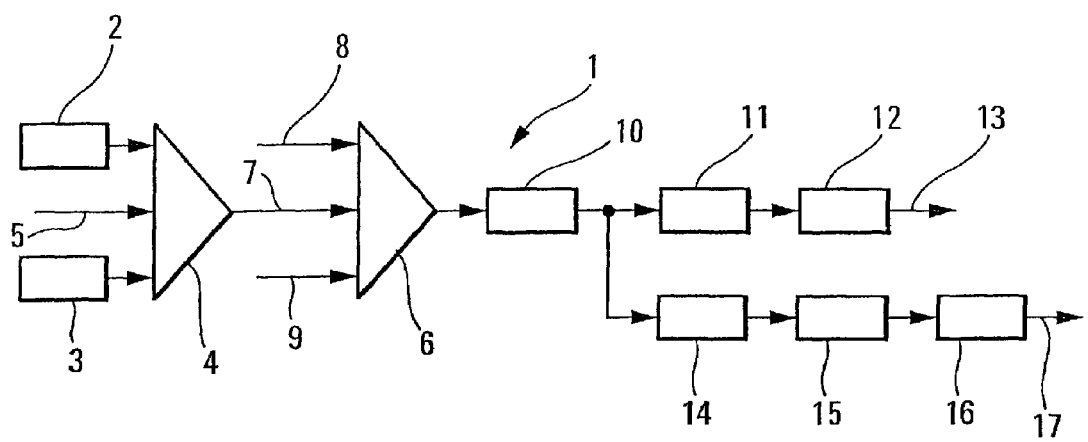

The present invention relates to a process and a system for piloting an aircraft, which are intended for generating orders for piloting said aircraft according to at least one piloting axis.

It relates more precisely to a piloting system which comprises at least two different piloting laws. It is known that a piloting law is a function which makes it possible to determine orders for piloting the aircraft which are intended to be transmitted to control surfaces of the latter, as a function of various parameters available on the aircraft, such as, for example, the speed, the angle of incidence, the attitude, pilot orders and possibly derivatives and integrals of these parameters.

Generally, the choice between the various piloting laws, for generating the piloting orders to be transmitted to the control surfaces, is made as a function of the values of various parameters of the aircraft.

Such an implementation involves drawbacks. In particular, in the case of piloting according to the pitch axis, it is often difficult with such a mode of selection, to keep the angle of incidence of the aircraft below a prescribed maximum value.

The present invention relates to a particularly effective piloting process which makes it possible in particular to remedy the existing drawbacks.

To this end, according to the invention, said process for piloting an aircraft, intended for generating orders for piloting said aircraft according to at least one piloting axis, in which process one uses at least two different piloting laws, relating to said piloting axis and each making it possible to determine piloting orders as a function of parameters of the aircraft, is noteworthy in that the following operations are carried out automatically and repetitively:

a) for each of said piloting laws, the derivative with respect to time of the function which corresponds to said piloting law and which takes into account the current values of the corresponding parameters is calculated;

b) the derivatives thus calculated are intercompared;

c) the derivative whose corresponding piloting law generates the piloting order of smallest absolute value is selected; and d) a selected derivitive is integrated in such a way as to obtain said piloting order according to said piloting axis.

The piloting law is therefore chosen not as a function of parameters of the aircraft, but as a function of the results of each law, the piloting law which generates the smallest order in absolute value (that is to say the most effective law for attaining the sought-after objective) being adopted. This law corresponds to the law whose derivative is smallest.

By calculating the derivatives it is possible to circumvent the known problem due to the presence of at least one integrator term in the functions corresponding to the piloting laws. Specifically, an integrator term in an inactive law can take any value whatsoever and the comparison with an active law is meaningless. Moreover, on changing law, one does not know to which value the integrator should be reinitialized. Consequently, by previously calculating the derivatives of the functions corresponding to the various laws and by comparing these derivatives, the aforesaid problems are avoided.

The present invention may be applied to the piloting of an aircraft according to one or simultaneously several of the various piloting axes (pitch axis, roll axis, yaw axis, engine thrust control axis) of the aircraft.

When piloting is carried out according to the pitch axis, the process in accordance with the invention allows natural piloting, while controlling the incidence which does not exceed the permitted maximum incidence, since the piloting law which in this case generates the least nose-up order is selected.

In this situation, at least one incidence protection law and one control law for the trajectory or (vertical) load factor are preferably used as piloting laws.

Advantageously, the derivative of said control law for the vertical load factor LoiNz is calculated from the expression:

$$d(LoiNz)/dt = d[F224.(d\theta/dt) - G220.Nzc + G221.(Nz - (\cos\theta/\cos\Phi) - ProtVmax)]/dt + F225.[Nz - \lim(Nzc + (\cos\theta/\cos\Phi) + ProtVmax)]$$

in which:

F224, F225, G220 and G221 are parameters;

$\theta$ is the longitudinal attitude of the aircraft;

$\Phi$ is the lateral attitude of the aircraft;

Nz is the actual vertical load factor of the aircraft;

Nzc is the commanded vertical load factor;

ProtVmax is the maximum value of a protection of the speed of the aircraft; and lim is a limiting function.

Moreover, advantageously, the derivative of said incidence protection law Prot$\alpha$ is calculated from the expression:

$$d(Prot\alpha)/dt = d[F831.(d\theta/dt) - (CO.\alpha com) + F830.(\alpha - \alpha prot)]/dt + F829.[\alpha - \alpha prot - \alpha com] + \lim[F833.(dV/dt)]$$

in which:

F829, F830, F831, F833 and CO are parameters;

$\alpha$ is the actual angle of incidence;

$\alpha com$ is the commanded angle of incidence;

$\alpha prot$ is a value of protection of the angle of incidence;

$\theta$ is the longitudinal attitude;

V is the actual speed of the aircraft; and lim is a limiting function.

Furthermore, advantageously, when said piloting axis is the pitch axis of the aircraft, for operation d):

said selected derivative, whose piloting law generates the piloting order of smallest absolute value, is integrated only if this derivative lies between a first derivative with respect to time of a minimum attitude protection and a second derivative with respect to time of a maximum attitude protection;

otherwise, if said selected derivative is less than said first derivative, the latter is integrated and if said selected derivative is greater than said second derivative, said second derivative is integrated.

Thus, the implementation of the invention is simplified, since instead of having an attitude protection for each piloting law, one has a single attitude protection which acts globally.

For this purpose, advantageously, one calculates:

said first derivative of minimum attitude protection Prot$\theta$min, from the expression:

$$d(Prot\theta min)/dt = F193.[K79.(d\theta/dt) + K78.d(d\theta/dt)/dt + K76.(\theta+15)];$$

and said second derivative of maximum attitude protection Prot$\theta$max, from the expression:

$$d(Prot\theta max)/dt = F193.[K79.(d\theta/dt) + K78.d(d\theta/dt)/dt + K77.(\theta-30)],$$

in which

F193, K76, K77, K78 and K79 are parameters; and

θ is the longitudinal attitude of the aircraft.

In the case of manual piloting of the aircraft according to the pitch axis by means of at least one standard control stick, a load factor control law, an incidence protection law and speed protection law are advantageously used as piloting laws, and the actuation of the control stick is translated simultaneously into a load factor instruction, into a limit incidence instruction and into a limit speed instruction, which are used respectively by said control law for the load factor, said incidence protection law and said speed protection law.

In this case, preferably, said speed protection law comprises a first (so-called "soft") law permitting exceeding of instruction and a second (so-called "hard") law not permitting exceeding of instruction.

Moreover, advantageously, said first law is a law of protection with respect to the operational maximum speed of the aircraft and said second law is a law of protection with respect to the structural limit speed of the aircraft.

The present invention also relates to a system for piloting an aircraft which is capable of generating orders for piloting the aircraft according to at least one piloting axis (pitch axis, roll axis, yaw axis and/or engine thrust axis).

According to the invention, said piloting system of the type comprising at least two piloting means, each of said piloting means comprising a piloting law which is different from that of the other piloting means and which makes it possible to determine piloting orders according to said piloting axis as a function of parameters of the aircraft, is noteworthy in that each of said piloting means is capable of calculating the derivative with respect to time of the function which represents the corresponding piloting law and which takes into account the current values of the corresponding parameters, and in that said piloting system furthermore comprises:

first means for intercomparing the derivatives calculated by said piloting means and for selecting a derivative; and second means for integrating a selected derivative in such a way as to obtain said piloting order according to said piloting axis.

Thus, by virtue of the invention, an effective piloting system is obtained which is moreover very simple, in terms of embodiment and understanding.

Advantageously, said first means comprise at least one voter. Within the framework of the present invention, the word voter is understood to mean a known system for comparison which comprises at least two inputs and an output and which compares at any incident the values present on the inputs and provides one of them to the output as a function of predefined rules. By way of illustration, a voter can comprise three inputs and one output and deliver to the output the median value of three values introduced respectively via said three inputs. It will be noted that, in the case of two piloting laws, whose results are transmitted respectively to two of said inputs, a fixed value is then moreover transmitted according to the invention to the third input.

As far as the pitch axis is concerned, the voter protection thus effected makes it possible to replace two known devices which are used: phase advance and locking the stick back (nose-up).

Additionally, in the case of piloting according to the pitch axis, advantageously, said piloting axis comprises third means, preferably a voter, for comparing a derivative, whose law generates the smallest nose-up piloting order, with derivatives of minimum and maximum attitude protection and for selecting the derivative exhibiting the median value, which will be integrated by said second means.

Furthermore, advantageously, whatever piloting axis is considered, the piloting system in accordance with the invention comprises at least one motor whose output is connected to the input of at least one of said piloting means.

The figures of the appended drawing will elucidate the manner in which the invention may be embodied. In these figures, identical references designate similar elements.

FIG. 1 is a schematic diagram of a piloting system in accordance with a first embodiment of the invention.

Figure 2:
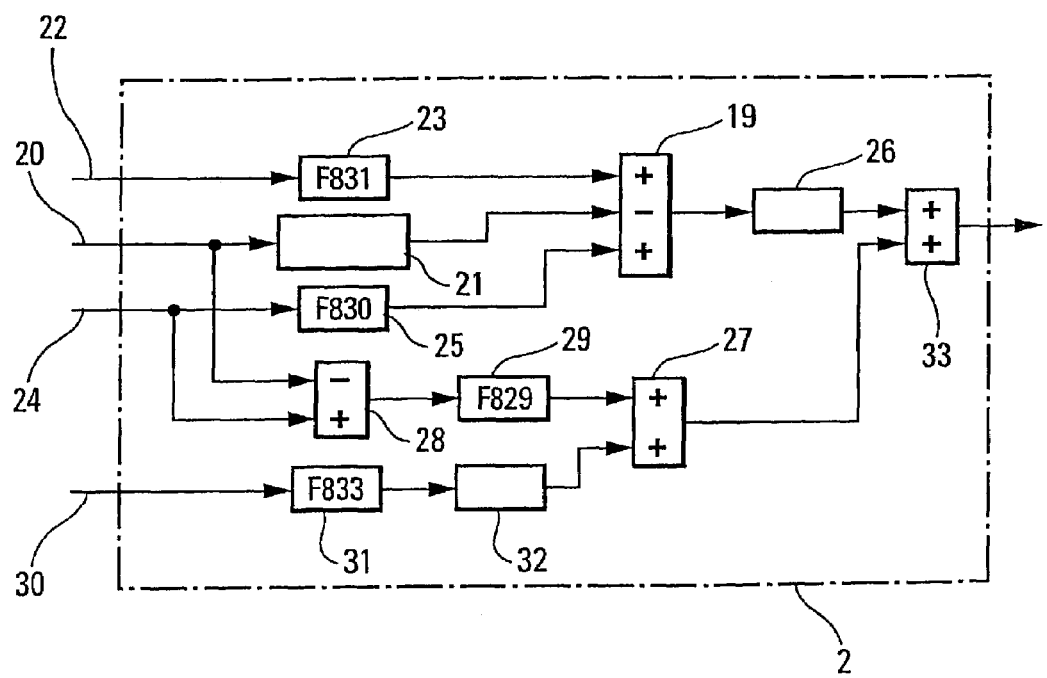
Figure 3:
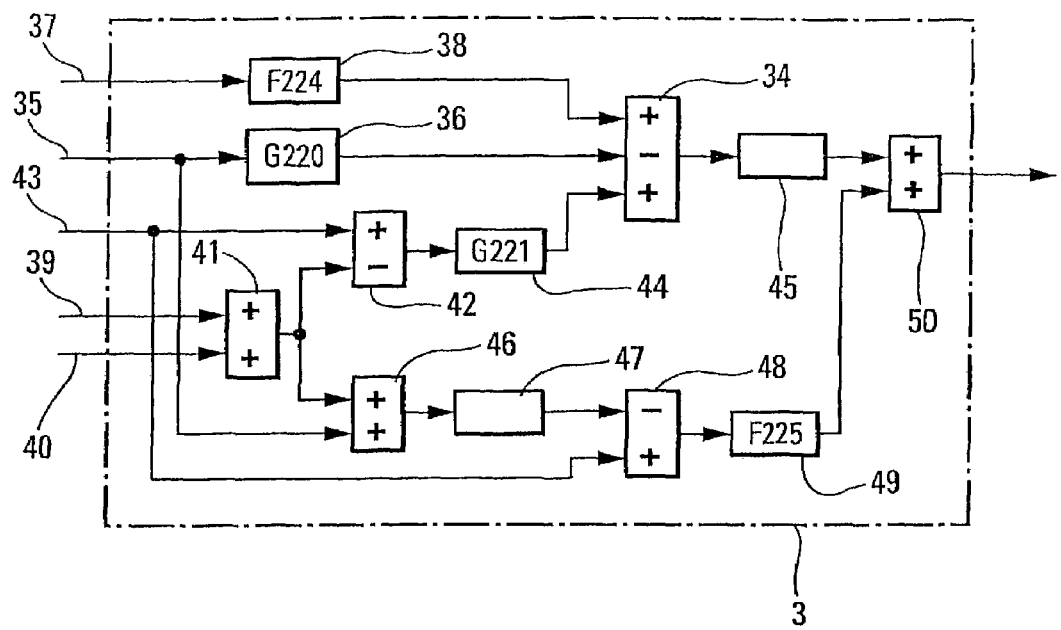

FIGS. 2 and 3 diagrammatically illustrate different means of piloting.

Figure 4:
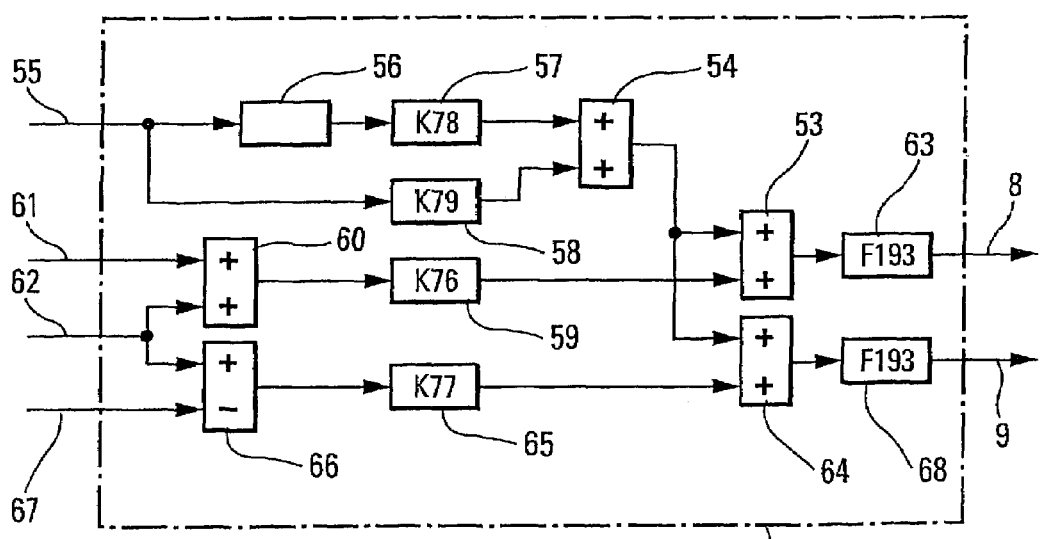

FIG. 4 diagrammatically illustrates a means of calculation making it possible to calculate derivatives of minimum and maximum attitude protection.

Figure 5:
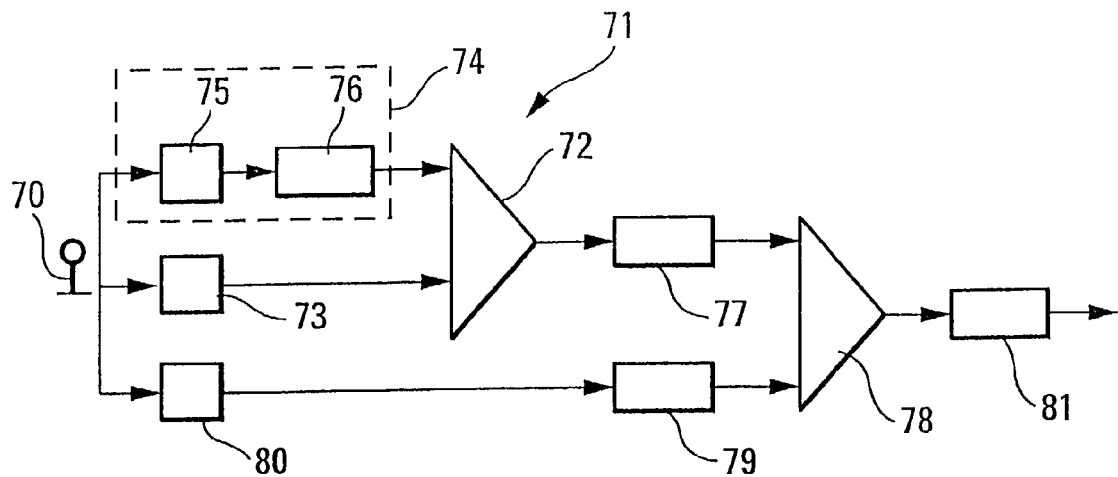

FIG. 5 is the schematic diagram of a piloting system in accordance with a second embodiment of the invention.

Figure 6:
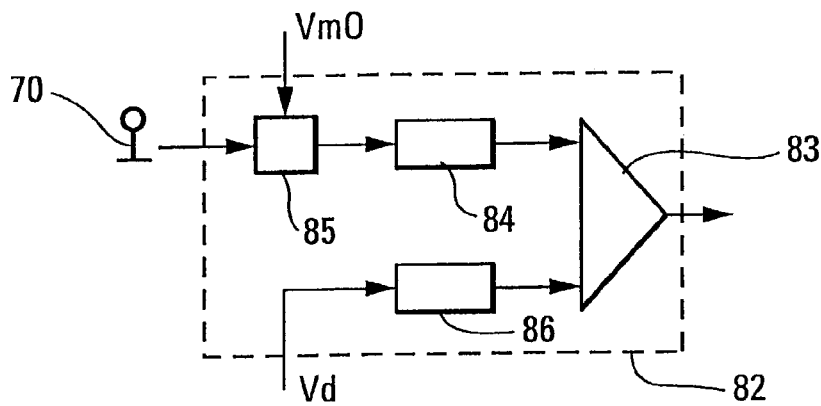

FIG. 6 diagrammatically represents a variant of a part of the piloting system of FIG. 4.

Figure 7:
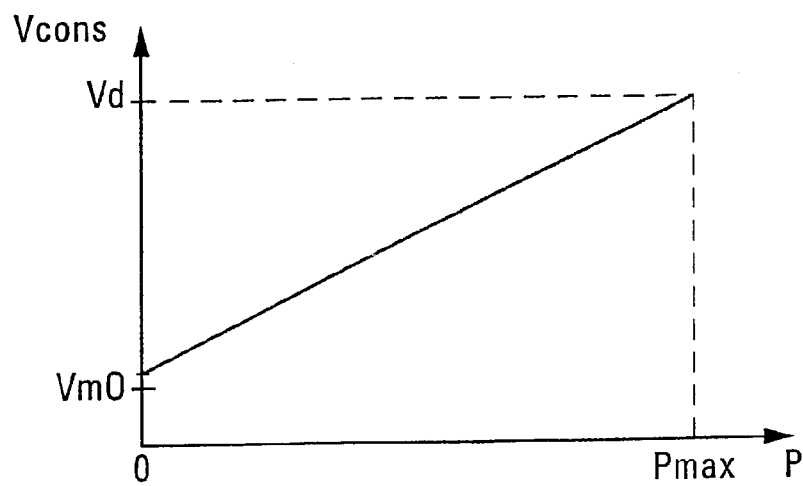

FIG. 7 is a graph making it possible to explain the variant of FIG. 6.

The system 1 in accordance with the invention and represented diagrammatically in FIG. 1 is a system for piloting an aircraft (not represented), in particular a transport airplane, which is capable of generating orders for piloting the aircraft according to at least one of the various piloting axes of said aircraft (pitch axis, roll axis, yaw axis, engine thrust control axis). Within the framework of the present invention, said system 1 can therefore pilot the aircraft either according to one, or according to several (two, three, four) of these piloting axes. The piloting orders generated by said piloting system 1 are transmitted, in standard fashion, to known piloting members of the aircraft, such as aerodynamic control surfaces for example. The same holds for the piloting system 71 represented in FIG. 5.

According to the invention, said piloting system 1 comprises at least, for piloting according to a particular piloting axis:

a plurality of piloting means 2 and 3, each of said piloting means 2 and 3 comprising a standard piloting law, which is different from that of the other piloting means and which makes it possible to determine piloting orders as a function of parameters (speed, angle of incidence, attitude, pilot orders, etc.) of the aircraft. According to the invention, each of said piloting means 2 and 3 calculates the derivative with respect to time of the function which represents the corresponding piloting law and which takes into account the current values of the corresponding parameters, as specified hereinbelow;

means 4 specified hereinafter for intercomparing the derivatives calculated by said piloting means 2 and 3 and for selecting a derivative specified hereinbelow; and means 10 for integrating a selected derivative in such a way as to be able to form said piloting order according to said piloting axis.

According to the invention, the means 4 comprise a voter, of standard type, which comprises three inputs and one output. Said voter intercompares the values provided to said three inputs and delivers the median value at its output.

Moreover, according to the invention, said system 1 also comprises means 6, preferably a voter, for comparing the derivative selected by the voter 4, with derivatives of minimum and maximum attitude protection, which are received via links 8 and 9 respectively.

Said system 1 moreover comprises, in a known manner:
in order to form orders according to said piloting axis, the results of which are transmitted by a link 13:
known means 11 of amplitude limitation (in °), making it possible to prevent the control surfaces from going to far; and
known means 12 of rate of swing limitation (in °/s), making it possible to prevent the control surfaces from moving too fast; and
for the management of the plan:
means of integration 14;
known means 15 of amplitude limitation; and
known means 16 of rate of swing limitation, whose output is linked to a link 17.

Although not exclusively, the present invention is particularly well adapted to piloting according to the pitch (elevation) axis of the aircraft.

Hence, in the preferred embodiments described hereinbelow, the system 1, 71 is intended for generating piloting orders according to said pitch axis.

A first embodiment is represented in FIGS. 1 to 4.

In this case, preferably, said means 2 and 3 comprise, respectively, a law of incidence protection Prot$\alpha$ and a vertical load factor control law LoiNz, which are specified hereinbelow.

Moreover, the third input 5 of the voter 4 receives:
in a first variant, a basic nose-down order so that the voter 4 then chooses, from among the results emanating from the piloting means 2 and 3, those which generate the least nose-up order; and
in a second variant, a speed piloting law, of standard type. Thus, a speed protection is effected.

According to the invention, the means 2 calculate the derivative of said incidence protection law Prot$\alpha$ from the expression:

$$d(Prot\alpha)/dt = d[F831.(d\theta/dt)-(CO.\alpha com)+F830.\\(\alpha-\alpha prot)]/dt+F829.[\alpha-\alpha prot-\alpha com]+lim\\ [F833.(dV/dt)]$$

in which:
F829, F830, F831, F833 and CO are parameters specified below;
$\alpha$ is the actual angle of incidence of the aircraft;
$\alpha com$ is the commanded angle of incidence;
$\alpha prot$ is a value of protection of the angle of incidence;
$\theta$ is the longitudinal attitude of the aircraft;
V is the actual speed of the aircraft; and
lim is a limiting function.

Within the framework of the present invention, a limiting function is a function whose output is equal to the input while it remains between a maximum threshold and a minimum threshold. If it is outside these limits, the output is limited and remains equal to the threshold attained.

Preferably, the expression lim[F833.(dV/dt)] has as thresholds: 20° nose-down and 2° nose-up.

To do this, said piloting means 2 comprise, as represented in FIG. 2:
a calculation means 19 which:
deducts the product (formed by a means of calculation 21) of the parameter CO times the angle $\alpha com$ received from a link 20, from the product (formed by a means of calculation 23) of the parameter F831 times the expression (d$\theta$/dt) received by a link 22; and
adds thereto the product (formed by a means of calculation 25) of the parameter F830 times the expression ($\alpha-\alpha prot$) received by a link 24;
a means 26 for differentiating the result emanating from the means of calculation 19;
a means of calculation 27 which computes the sum:
of the product (formed by a means of calculation 29) of the parameter F829 times the difference [($\alpha-\alpha prot$)) $-\alpha com$] calculated by a means of calculation 28; and
of the product (formed by a means of calculation 31 and limited by a means of calculation 32) of the parameter F833 times the expression (dV/dt) received by a link 30; and
a means of calculation 33 which computes the sum of the results emanating from the means 26 and 27.

The aforesaid parameters F829, F830, F831 and F833 take, in a preferred embodiment, the values indicated hereinbelow, as a function of the commanded speed VC of the aircraft.

| VC   | 0    | 100  | 125  | 180  | 210 | 250  | 300  | 350  |
|------|------|------|------|------|-----|------|------|------|
| F829 | 1.6  | 1.6  | 1.6  | 1.48 | 0.9 | 1    | 1    | 1    |
| F830 | 3.8  | 3.8  | 2.9  | 0.92 | 1.2 | 1    | 0.95 | 0.8  |
| F831 | 3.28 | 3.28 | 2.68 | 1.09 | 1.4 | 1.15 | 1    | 0.75 |
| F833 | 6    | 6    | 6    | 4.5  | 2   | 1.2  | 0    | 0    |

Moreover, the parameter CO takes the following values according to case X (forward center of gravity of the aircraft) and case Y (aft center of gravity of the aircraft).

| VC | 0     | 130    | 200   | 250   | 300   | 350   |
|----|-------|--------|-------|-------|-------|-------|
| X  | −8.86 | −8.86  | −5.88 | −4.86 | −3.55 | −3.12 |
| Y  | −4.96 | −4.968 | −2.97 | −2.07 | −1.80 | −1.71 |

Moreover, according to the invention, the means 3 calculate the derivative of said control law for the vertical load factor LoiNz from the expression:

$$d(LoiNz)/dt = d[F224.(d\theta/dt)-G220.Nzc+G221.(Nz-\\(\cos\theta/\cos\Phi)-ProtVmax)]/dt+F225.[Nz.lim(Nzc+\\(\cos\theta/\cos\Phi)+ProtVmax)]$$

in which:
F224, F225, F220 and G221 are parameters specified below;
$\theta$ is the longitudinal attitude of the aircraft;
$\Phi$ is the lateral attitude of the aircraft;
Nz is the actual vertical load factor of the aircraft;
Nzc is the commanded vertical load factor;
ProtVmax is the maximum value of protection of the speed of the aircraft; and
lim is a limiting function.

By way of example, the expression lim(Nzc+(cos $\theta$/cos $\Phi$)+ProtVmax) has as thresholds: −1 g (nose down) and 2.5 g (nose up).

To do this, said piloting means 3, comprise, as represented in FIG. 3:
a means of calculation 34 which:
deducts the product (formed by a means of calculation 36) of the parameter G220 times the commanded vertical load factor Nzc received by a link 35, from the product (formed by a means of calculation 38) of the parameter F224 times the expression (dθdt) received by a link 37; and adds thereto the product (formed by a means of calculation 44) of the parameter G221 times the difference (formed by a means of calculation 42) between, on the one hand, the actual vertical load factor Nz (received by a link 43) and, on the other hand, the sum (formed by a means of calculation 41) of the expressions (cos θ/cos Φ) and (ProtVmax) received by links 39 and 40 respectively;

a means 45 for differentiating the result emanating from the means of calculation 34;

a means of calculation 48 which computes the difference between the actual vertical load factor Nz and the sum (Nzc+(cos θ/cos Φ)+ProtVmax) calculated by a means of calculation 46 and limited by a means of limitation 47;

a means of calculation 49 for multiplying the result emanating from the means 48 by the parameter F225; and a means for calculation 50 which computes the sum of the results emanating from the means 45 and 49.

Indicated hereinbelow are preferred values of the parameters F224, F225, G220 (according to case X and case Y) and G221 (according to case X and case Y).

| VC   | 0     | 120    | 130   | 160   | 190   | 210   | 280   | 350   |
|------|-------|--------|-------|-------|-------|-------|-------|-------|
| F224 | 2.2   | 2.2    | 1.9   | 1.35  | 1.05  | 0.58  | 0.45  | 0.41  |
| F225 | 15    | 15     | 13    | 10    | 7.5   | 3.8   | 2.9   | 2.71  |

| VC | 0     | 130    | 200   | 250   | 300   | 350   |
|----|-------|--------|-------|-------|-------|-------|
| X  | −8.86 | −8.86  | −5.88 | −4.86 | −3.55 | −3.12 |
| Y  | −4.96 | −4.968 | −2.97 | −2.07 | −1.80 | −1.71 |

| VC | 120 | 130 | 150 | 190 | 210  | 320  |
|----|-----|-----|-----|-----|------|------|
| X  | 14  | 8.2 | 4.6 | 3.5 | 0.51 | 0.05 |
| Y  | 23  | 17  | 12  | 8   | 5    | 2    |

The system 1 furthermore comprises a calculation unit 52 which calculates:

said first derivative of minimum attitude protection Protθmin which is transmitted by the link 8 to the voter 6, from the expression:

$$d(Prot\theta min)/dt = F193.[K79.(d\theta/dt) + K78.d(d\theta/dt)/dt + K76.(\theta+15)];$$

and said second derivative of maximum attitude protection Protθmax which is transmitted by the link 9 to the voter 6, from the expression:

$$d(Prot\theta max)/dt = F193.[K79.(d\theta/dt) + K78.d(d\theta/dt)/dt + K77.(\theta-30)].$$

The parameters K76 and K77 equal 0.5 and the parameters K78 and K79 equal 1 and 1.5 respectively.

As regards the parameter F193, it takes the following values, as a function of the commanded speed VC of the aircraft.

| VC   | 0   | 120 | 130 | 160  | 190  | 210  | 280  | 350  |
|------|-----|-----|-----|------|------|------|------|------|
| F193 | 2.2 | 2.2 | 1.9 | 1.35 | 1.05 | 0.58 | 0.45 | 0.41 |

As may be seen in FIG. 4, the calculation unit 52 comprises, to do this:

a means of calculation 53 which computes the sum:
of a sum (formed by a means of calculation 54), on the one hand, of the product (formed by a means of calculation 57) of the parameter K78 times the derivative (formed by a means of calculation 56) of the expression (dθ/dt) (received by a link 55) and, on the other hand, of the product (formed by a means of calculation 58) of the parameter K79 times this expression; and of the product (formed by a means of calculation 59) of the parameter K76 times a sum (formed by a means of calculation 60) of the value 15 and of θ which are received by links 61 and 62 respectively;

a means of calculation 63 which multiplies the result emanating from the means of calculation 53 by the parameter F193 to obtain said first derivative to be transmitted by the link 8;

a means of calculation 64 which computes the sum:
of the result emanating from the means of calculation 54; and
of the product (formed by a means of calculation 65) of the parameter K77 times the difference (formed by a means of calculation 66) between 0 and the value 30 (received by a link 67); and a means of calculation 68 which multiplies the result emanating from the means of calculation 64 by the parameter F193 to obtain said second derivative to be transmitted by the link 9.

It will be noted that in this way the means 10 integrate the derivative selected by the voter 4, whose piloting law generates the smallest nose-up piloting order, only if this derivative lies between the (first) derivative with respect to time of the minimum attitude protection Protθmin and the (second) derivative with respect to time of the maximum attitude protection Protθmax. Otherwise, if the derivative selected by the voter 4 is less than said first derivative, the means 10 integrate the latter and if the derivative selected is greater than said second derivative, the means 10 integrate said second derivative.

The piloting system 1 in accordance with the invention can be integrated into a standard electric flight control device. In this case, the standard switching logic "LoiNz"⇔"Protα" is replaced by a permanent vote between the various laws which may come into play. This vote is therefore carried out in two steps: firstly selection of the least nose-up order between the laws "loiNz" and "Protα" so as not to exceed the maximum incidence αmax, then limitation of the resulting order by two attitudes, nose-up and nose-down. The architecture of the system 1 is therefore very simple in terms of embodiment and comprehension.

Moreover, by virtue of the invention, the following advantages are obtained in particular:

the system 1 is effective and inexpensive;
said system 1 does not require:
reinialization of an integrator when passing from one piloting law to another;

logic for switching from one piloting law to the other; and a double set of gains in incidence protection;

the formulation of an attitude protection (means 6 and 52) common to the various laws;

the elimination of two specific devices: phase advance and locking of the stick back (nose-up); and natural piloting, with control of the angle of incidence.

A second embodiment of the piloting system 71 in accordance with the invention and which is represented in FIG. 5, is adapted to the manual piloting of the aircraft by means of a standard control stick 70 (ministick, rudder bar, etc.) which can be actuated by a pilot of the aircraft.

Said piloting system 71 comprises a voter 72 which receives as inputs:

on the one hand, a load factor instruction received from a means 73 which deduces this instruction from the amplitude of the actuation (deflection) of said control stick 70; and on the other hand, a load factor value Nzpvit received from a means 74 which comprises:

a means 75 which deduces a speed instruction Vt from the amplitude of the actuation (deflection) of said control stick 70; and a piloting means 76 which comprises a speed protection law (making it possible to limit the speed of the aircraft during a nose-down manoeuvre) and which calculates, from this speed instruction Vt, the load factor value Nzpvit which is transmitted to said voter 72.

Said piloting means 76 calculates said load factor value Nzpvit from the following relations:

$$Nzpvit = Nzeq + \Delta Nzpvit$$

with $$\begin{cases} Nzeq = \cos\theta/\cos\Phi \\ \Delta Nzpvit = Kp \cdot (V-Vt) + Kd \cdot (dV/dt) \end{cases}$$

in which relations:

$\theta$ is the angle of longitudinal attitude (pitch) of the aircraft;

$\Phi$ is the angle of lateral attitude (roll) of the aircraft;

V is the standard air speed of the aircraft; and

Kp and Kd are two predetermined coefficients.

The voter 72 outputs the larger of the two values presented on its inputs. The value of this output is therefore greater than or equal to said value Nzpvit, thereby making it possible to attain the objective of limiting the speed of the aircraft below a maximum value Vmax. Specifically, during a nose-down manoeuvre, the sign of the load factor Nz is by convention negative, while it is positive during a nose-up manoeuvre. The speed protection having the effect of limiting the nose-down manoeuvre, it is therefore necessary to take account of the larger of the two values present at the inputs of the voter 72.

The output of the voter 72 is connected to a piloting means 77 which comprises a load factor control law, and whose output is connected to a first input of a voter 78. This voter 78 is connected by a second input to the output of a piloting means 79 which comprises an incidence protection law. This piloting means 79 receives as input, by a means 80, an instruction emanating from the control stick 70 and translated into terms of angle of incidence $\alpha$ by this means 80. The output of said piloting means 79 provides a control surface rate value such that the implementation of the latter leads to an angle of incidence of the aircraft which is less than or equal to a maximum value $\alpha$max.

The voter 78 outputs the larger of the two values present on its inputs. The value of this output is therefore greater than or equal to the incidence protection instruction, thereby making it possible to attain the objective of limiting the angle of incidence of the aircraft below the value $\alpha$max. Specifically, by convention, the deflections of the elevation control surface are written with a positive sign upon a nose-down action and with a negative sign upon a nose-up action. The incidence protection having the effect of limiting a nose-up action, it is therefore necessary to take account of the larger of the two values present at the inputs of the voter 78. The voter 78 output, expressed in terms of rate of the elevation control surface, is sent to an input of an integrator 81 which is similar to the means 10 of FIG. 1. The output from this integrator 81 is representative of the position of the elevation control surface and constitutes a control of the latter.

The piloting system 71 therefore makes it possible to attain the fixed objectives of limiting the angle of incidence and the speed of the aircraft. It is advantageous, since it calls upon voters 72, 78 which at any instant compare values present on their inputs, said values being based in particular on various piloting laws calculated simultaneously, in such a way that the output from each voter 72, 78 alters continuously over time. This makes it possible to resolve an existing problem in standard piloting systems, namely the presence of discontinuities of the instruction sent to a control surface when toggling from a first piloting law to a second piloting law.

In the preferred embodiment represented in FIG. 5, the actuation (deflection) of the control stick 70 is therefore translated simultaneously into instructions for load factor for limit speed and for limit angle of incidence, by said means 73, 75 and 80 respectively. Thus, the aircraft being in a steady state, a variation of the position of the control stick 70 is interpreted as a variation of the load factor instruction. Likewise, it is interpreted, by the speed protection law as a variation of the limit speed instruction, and by the incidence protection as a variation of the limit angle of incidence instruction. At a given instant, a single piloting law being selected owing to the use of the voters 72 and 78, it is possible to consider the instruction emanating from the control stick 70 according to a single unit, namely that corresponding to the input of the selected piloting law.

In a particular embodiment, the means 74 can be replaced, in the piloting system 71 of FIG. 5, by a means 82 represented in FIG. 6. This means 82 comprises a voter 83 making it possible to take account of the more constraining of the following two piloting laws:

a law of protection with respect to the maximum operational speed of the aircraft Vm0, implemented by a piloting means 84 in the form of a feedback control slaved to a speed instruction greater than or equal to Vm0. This instruction, which is a function of the position of the control stick 70, is delivered by a means 85, which receives as input said position of the control stick 70, as well as the value of Vm0. The aforesaid coefficients Kp and Kd, corresponding to this law, are chosen so that this protection is applied in a "soft" or non-imperative manner (that is to say by permitting exceeding), since the aircraft must be able to fly at the speed Vm0 without untimely activation of said protection; and a law of protection with respect to the structural limit speed Vd, implemented by a piloting means 86. This law receives said speed Vd as instruction. This protection law limits the nose-down manoeuvres of the aircraft. The speed Vd must never be exceeded. If it were exceeded, it might lead to rupture of the airframe of the aircraft. The coefficients Kp and Kd corresponding to this law are therefore chosen in such a way that this protection is applied in a "hard" or imperative manner, that is to say without it being possible to exceed the instruction.

In a preferred embodiment of the invention, the means 85 ensuring the translation into speed of the position of the control stick 70 is such that the speed instruction Vcons, which is present at the output of said means 85 and which depends on the position P of the control stick 70, corresponds to Vm0 or to a value substantially greater than Vm0 when the control stick 70 is in the null position, and corresponds to a speed at most equal to Vd when said control stick 70 is at the extreme position Pmax during a nose-down manoeuvre (FIG. 7).

It will be noted that the invention has been described while considering values of speed (speed instruction Vt, maximum operational speed Vm0, structural limit speed Vd, etc.). It is also possible to take into consideration Mach values as input parameters of the piloting system 1, a standard transformation of said Mach values making it possible to obtain the corresponding speeds.

What is claimed is:

1. A process for piloting an aircraft by generating orders for piloting said aircraft on at least one piloting axis using at least two different piloting laws, which relate to said piloting axis and which each are used to determine the piloting orders as a function of parameters of the aircraft, wherein, for said piloting axis, the following operations are carried out automatically and repetitively:
    a) for each of said piloting laws, the derivative with respective to time of a function which corresponds to said piloting law and which takes into account the current values of the corresponding parameters is calculated;
    b) the derivatives thus calculated are intercompared;
    c) the calculated derivative whose corresponding piloting law generates the piloting order of smallest absolute value is selected; and
    d) the selected derivitive is integrated in such a way as to obtain a piloting order for said piloting axis.

2. The process as claimed in claim 1, wherein said piloting axis is the pitch axis of the aircraft.

3. The process as claimed in claim 2, wherein at least one incidence protection law and one control law for the vertical load factor are used as the piloting laws.

4. The process as claimed in claim 3, wherein the derivative of said control law for the vertical load factor LoiNz is calculated from the expression:

$$d(LoiNz)/dt = d[F224.(d\theta/dt) - G220.Nzc + G221.(Nz-(\cos\theta/\cos\Phi) - ProtVmax)]/dt + F225.[Nz-lim(Nzc + (\cos\theta/\cos\Phi) + ProtVmax)], \text{ in which:}$$

F224, F225, G220 and G221 are some of the corresponding parameters;
$\theta$ is the longitudinal attitude of the aircraft;
$\Phi$ is the lateral attitude of the aircraft;
Nz is the actual vertical load factor of the aircraft;
Nzc is a commanded vertical load factor;
ProtVmax is a maximum value of a protection of the speed of the aircraft; and
lim is a limiting function.

5. The process as claimed in claim 3, wherein the derivative of said incidence protection law Prot$\alpha$ is calculated from the expression:

$$d(Prot\alpha)/dt = d[F831.(d\theta/dt) - (CO.\alpha com) + F830.(\alpha - \alpha prot)]/dt + F829.[\alpha - \alpha prot - \alpha com] + lim[F833.(dV/dt)], \text{ in}$$

which:
F829, F830, F831, F833 and CO are some of the corresponding parameters;
$\alpha$ is the actual angle of incidence of the aircraft;
$\alpha$com is a commanded angle of incidence;
$\alpha$prot is a value of protection of the angle of incidence;
$\theta$ is the longitudinal attitude of the aircraft;
V is the actual speed of the aircraft; and
lim is a limiting function.

6. The process as claimed in claim 1, wherein said piloting axis is the pitch axis of the aircraft and wherein, for operation (d):
    said selected derivative, whose piloting law generates the piloting order of smallest absolute value, is integrated only if the value of this derivative lies between the value of a first derivative with respect to time of a minimum attitude protection and the value of a second derivative with respect to time of a maximum attitude protection;
    otherwise, if the value of said selected derivative is less than that of said first derivative, the latter is integrated and if the value of said selected derivative is greater than that of said second derivative, said second derivative is integrated.

7. The process as claimed in claim 6, further comprising:
    calculating said first derivative of minimum attitude protection Prot$\theta$min, from the expression: $d(Prot\theta min)/dt = F193.[K79.(d\theta/dt) + K78.d(d\theta/dt)/dt + K76.(\theta+15)]$; and
    calculating said second derivative of maximum attitude protection Prot$\theta$max, from the expression: $d(Prot\theta max)/dt = F193.[K79.(d\theta/dt) + K78.d(d\theta/dt)/dt + K77.(\theta-30)]$, in which
F193, K76, K77, K78 and K79 are parameters; and
$\theta$ is the longitudinal attitude of the aircraft.

8. The process as claimed in claim 3 applied in an aircraft supporting manual piloting of the aircraft by means of at least one control stick, wherein:
    a speed protection law is used as one of the piloting laws, and
    the actuation of the control stick is translated simultaneously into a load factor instruction, a limit incidence instruction and a limit speed instruction, which are used respectively by said control law for the load factor, said incidence protection law and said speed protection law.

9. The process as claimed in claim 8, wherein said speed protection law comprises a first law permitting a first limit speed instruction to be exceeded and a second law not permitting a second limit speed instruction to be exceeded.

10. The process as claimed in claim 9, wherein said first law is a law of protection with respect to an operational maximum speed (Vm0) of the aircraft and said second law is a law of protection with respect to a structural limit speed (Vd) of the aircraft.

11. The process as claimed in claim 1, wherein said piloting axis is the roll axis of the aircraft.

12. The process as claimed in claim 1, wherein said piloting axis is the yaw axis of the aircraft.

13. The process as claimed in claim 1, wherein said piloting axis is the control axis for the thrust of the engines of the aircraft.

* * * * *